(12) United States Patent
Kalbassi et al.

(10) Patent No.: US 7,022,159 B2
(45) Date of Patent: Apr. 4, 2006

(54) PROCESS AND APPARATUS FOR TREATING A FEED GAS

(75) Inventors: Mohammad Ali Kalbassi, Weybridge (GB); Paul Higginbotham, Guildford (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/620,394

(22) Filed: Jul. 16, 2003

(65) Prior Publication Data

US 2004/0118279 A1  Jun. 24, 2004

(30) Foreign Application Priority Data

Jul. 19, 2002  (GB)  .................................. 0216914

(51) Int. Cl.
*B01D 53/047* (2006.01)

(52) U.S. Cl. ............. 95/99; 95/105; 95/106; 95/120; 95/123; 95/139; 96/115; 96/130; 96/143; 96/153

(58) Field of Classification Search ............ 95/96–106, 95/115, 120, 123, 139, 109, 126–128, 130–133, 95/143, 144, 153, 154
See application file for complete search history.

(56) References Cited

U.S. PATENT DOCUMENTS

| | | | | |
|---|---|---|---|---|
| 3,986,849 A | * | 10/1976 | Fuderer et al. | ............... 95/100 |
| 4,000,990 A | * | 1/1977 | Bingham | ..................... 95/103 |
| 4,234,322 A | * | 11/1980 | De Meyer et al. | ............... 95/19 |
| 4,375,363 A | * | 3/1983 | Fuderer | .......................... 95/97 |
| 4,402,712 A | * | 9/1983 | Benkmann | ..................... 95/98 |
| 4,436,533 A | * | 3/1984 | Bannon | .......................... 95/98 |
| 4,475,929 A | * | 10/1984 | Fuderer | .......................... 95/97 |
| 4,589,888 A | * | 5/1986 | Hiscock et al. | ................ 95/100 |
| 4,661,125 A | * | 4/1987 | Haruna et al. | ................ 95/102 |
| 4,981,499 A | | 1/1991 | Hay et al. | |
| 5,203,888 A | * | 4/1993 | Maurer | ....................... 95/101 |
| 5,571,309 A | | 11/1996 | Kumar | |
| 5,614,000 A | | 3/1997 | Kalbassi et al. | ................ 95/96 |
| 5,656,065 A | | 8/1997 | Kalbassi et al. | ................ 95/96 |
| 5,846,295 A | | 12/1998 | Kalbassi et al. | ................ 95/105 |
| 5,885,650 A | | 3/1999 | Melody et al. | ............... 427/79 |
| 5,938,816 A | | 8/1999 | Harle et al. | |
| 5,958,109 A | | 9/1999 | Fuderer | |
| 6,210,466 B1 | * | 4/2001 | Whysall et al. | ................ 95/100 |
| 6,402,814 B1 | | 6/2002 | Krauss et al. | |
| 2002/0139246 A1 | * | 10/2002 | Kumar et al. | .................. 95/98 |

FOREIGN PATENT DOCUMENTS

EP  1 101 732 A1  5/2001

\* cited by examiner

*Primary Examiner*—Robert H. Spitzer
(74) *Attorney, Agent, or Firm*—Willard Jones, II

(57) ABSTRACT

A process and an apparatus related to the reduction of the level of a component in a feed gas such as air involving passing the gas to at least three parallel thermal swing adsorption zones charged with an adsorbent and operating according to an adsorption cycle, wherein the cycle of each zone is phased with respect to that of the other zones so that at any point during the cycle, the number of zones in the adsorption step is greater than the number of zones not in the adsorption step.

27 Claims, 2 Drawing Sheets

PROCESS AND APPARATUS FOR TREATING A FEED GAS

BACKGROUND OF THE INVENTION

This invention relates to a process and apparatus for treating a feed gas. In particular, the invention relates to a thermal swing adsorption (TSA) process using at least three adsorption beds for removing or at least reducing the level of a component in a feed gas to render it suitable for downstream processing and apparatus for use in the process. The invention is especially useful in removing components from a feed gas on a large scale where conventional processes and apparatus are not suitable for use.

Where a feed gas is to be subjected to downstream processing, it may often be desirable or necessary to remove certain components from the feed gas prior to such processing. As an example, high boiling materials for example water and carbon dioxide which may be present in a feed gas, for example air, must be removed where the mixture is to be subsequently treated in a low temperature, for example cryogenic, process. If relatively high boiling materials are not removed, they may liquefy or solidify in subsequent processing and lead to pressure drops, flow difficulties or other disadvantage in the downstream process. Hazardous, for instance explosive, materials are suitably removed prior to further processing of the feed gas so as to reduce the risk of build-up in the subsequent process thereby presenting a hazard. Hydrocarbon gases, for example acetylene, may present such a hazard.

In an air separation process, the gas is typically compressed using a main compressor (MAC) followed by cooling and removal of the thus condensed water in a separator. The gas may be further cooled using for example refrigerated ethylene glycol. The bulk of the water is removed in this step by condensation and separation of the condensate. The gas is then passed to an adsorption process where the components to be removed from the feed gas are removed by adsorption and then to an air separation unit. In treating air, water is conventionally removed first and then carbon dioxide by passing the feed gas through a single adsorbent layer or separate layers of adsorbent selected for preferential adsorption of water and carbon dioxide prior to feeding the treated air to a downstream separation process.

Several methods are known for removing an undesired component from a feed gas by adsorption on to a solid adsorbent including temperature swing adsorption (TSA) and pressure swing adsorption (PSA), thermal pressure swing adsorption (TPSA) and thermally enhanced pressure swing adsorption (TEPSA). Conventionally in such methods, two adsorbent beds are employed in a parallel arrangement with one being operated for adsorption while the other is off-line and being regenerated and then the roles of the beds are periodically reversed in the operating cycle. The adsorption bed is said to be "on-line" during the adsorption step.

In a TSA process, the adsorption step generates heat of adsorption causing a heat pulse to progress downstream through the adsorbent bed. The heat pulse is allowed to proceed out of the downstream end of the adsorbent bed during the feed or on-line period. After adsorption, the flow of feed gas is shut off from the adsorbent bed which is then depressurised. The adsorbent is then exposed to a flow of hot regeneration gas, typically a waste stream or other gas from the downstream process, which strips the adsorbed materials from the adsorbent and so regenerates it for further use. Regeneration conventionally is carried out in a direction counter to that of the adsorption step. The bed is then repressurised in readiness to repeat the adsorption step.

A PSA system typically involves a cycle in which the bed is on-line, and then depressurised, regenerated and then repressurised before being taken back on-line. Depressurisation involves releasing pressurised gas and leads to waste, generally known as "switch loss". In PSA systems, the pressure of the regeneration gas is lower than that of the feed gas. It is this change in pressure that is used to remove the adsorbed component from the adsorbent. However, cycle times are usually short, for example of the order of 15 to 30 minutes, as compared with those employed in a TSA system, which may be for example of the order of 2 to 20 hours. PSA therefore has certain disadvantages including unacceptable switch loss due to the relatively high frequency of switching between on-line operation and regeneration, especially in operating large capacity plant.

U.S. Pat. No. 5,656,065 describes a PSA process that employs three beds operated in a phased cycle which aims to reduce switch loss and improve continuity of flow of the feed gas to a downstream process. The purpose of the third bed is to allow a process cycle in which a small flow of pressurised feed gas is fed to the bed undergoing repressurisation. Hence, the repressurisation step is relatively long but a reduction in the interruption of the treated gas to a downstream process is advantageously secured.

Thermal pressure swing adsorption (TPSA) is also suitable for removing components from a feed gas by adsorption. In a TPSA system an undesired component is typically adsorbed in a first zone in which an adsorption medium is disposed for example activated alumina or silica gel. A second undesired component is then adsorbed in a second zone. TPSA, utilises a two stage regeneration process in which one adsorbed component is desorbed by TSA and another is desorbed by PSA. A TPSA process is described in U.S. Pat. No. 5,885,650 and U.S. Pat. No. 5,846,295.

In thermally enhanced PSA (TEPSA), desorption occurs by feeding a regeneration gas at a pressure lower than the feed gas and at a temperature greater than it and subsequently replacing the hot regeneration gas by a cold regeneration gas. The heated regeneration gas allows the cycle time to be extended as compared to that of a PSA system so reducing switch losses as heat generated by adsorption within the bed may be replaced in part by the heat from the hot regeneration gas. A TEPSA process is described in U.S. Pat. No. 5,614,000.

TSA, TPSA and TEPSA systems require the input of thermal energy and may require the use of insulated vessels, a regeneration gas preheater and an inlet end precooler and generally the high temperatures impose a more stringent and costly mechanical specification for the system. In operation, there is extra energy cost associated with using the preheater.

By the term "thermal swing adsorption" we mean adsorption processes and apparatus for operating the process in which thermal energy is input to regenerate the adsorbent and includes TPSA and TEPSA processes in addition to TSA unless otherwise stated.

TSA apparatus typically comprises a pair of adsorber vessels, both containing adsorbent. The vessels may be of any conventional type including the vertical, horizontal and radial type.

Conventional purification in a TSA process, especially where larger vessels are employed, may be problematic because the flow characteristics of the gas being processed may place limitations due to the need to avoid undue fluidization of the adsorbent bed and unacceptable pressure drop. In addition complex design of vessel geometry to address these issues, especially to accommodate large flows, may themselves introduce further problems. Accordingly, large vessels present certain problems and there are practical limits for their use.

Radial flow adsorbers have been employed to reduce problems with flow but they are typically more expensive than vertical and simple horizontal vessels. For radial beds, a higher ratio of bed height to bed diameter is required to gain a higher flow. In addition the bed's effective thickness is typically limited by the diameter which may itself be limited by constraints in transporting the adsorption vessel in manufacture and assembly of the plant. Moreover, the bed size is limited by the need to avoid a large pressure drop and lack of uniformity of flow.

In a horizontal bed, a reduction in bed thickness and increase in the ratio of effective bed length to diameter also has practical limits and long horizontal beds are therefore undesirable.

To increase capacity, a "four bed" configuration may be used in a TSA process in which two beds are on line with two beds being regenerated at the same time and the regenerated beds then being placed on-line and the other, exhausted beds being regenerated to provide a high throughput. The four beds are typically operated as two pairs of beds and the phasing of the adsorption/regeneration cycle of the two pairs need not be co-ordinated. In this way four simple vessels having a conventional geometry and design may be used to avoid difficulties of pressure drops and transportation which could be encountered if larger scale equipment were to be employed. This approach however requires significant capital investment and adds to the complexities of design of a large scale separation unit.

U.S. Pat. No. 5,571,309 describes an adsorption process in which a high pressure and a low pressure feed stream are passed to each of a plurality of adsorption beds. The beds are operated in an out of phase cycle. The feed for any given bed is fed sequentially at low and high pressure during a single adsorption cycle and it is necessary to utilise a repressurisation stage just prior to the high and low pressure feed stages. This process seeks to address the problem of providing a product stream at high and low pressure from a single adsorption unit.

The process of U.S. Pat. No. 5,571,309 does not disclose a process for treating a feed gas on a large scale without introducing undue complexity or cost in order to avoid or address the technical difficulties of unacceptably high pressure drop and feed gas flow distribution which are associated with operation of a conventional TSA process on a large scale.

BRIEF SUMMARY OF THE INVENTION

We have now found that technical problems such as undesirable fluid flow, bed fluidisation and unacceptable pressure drop and economic and practical problems including cost, design complexity and difficulties in transporting large-scale apparatus may be reduced or avoided by operating a TSA process using at least three adsorption zones in which, in use, at least two of the zones are always on-line and in which the feed gas is fed to the process continuously at a pressure which is generally constant in the adsorption step of the process. Each of the zones repeatedly passes through the cycle of adsorption and regeneration, the each zone being at a point on the cycle which is out of phase with the other zones so that at any given time at least two zones are adsorbing a component of the feed gas and a third zone is being regenerated and is brought on-line as or before one of the zones in the adsorption phase is taken off-line to be regenerated. By employing a TSA process, characteristics inherent in a PSA process are also avoided.

A first aspect of the invention provides a process for the reduction of the level of a component in a feed gas comprising passing the feed gas to at least three parallel thermal swing adsorption zones, each zone containing an adsorbent and being operated in an adsorption cycle which comprises an adsorption step to remove or to reduce the level of the component from the feed gas and in which the feed gas is fed continuously to the adsorption zone during the adsorption step, depressurisation of the adsorption zone, a regeneration step to desorb the adsorbed component and repressurisation of the adsorption zone, wherein the adsorption cycle of each zone is phased with respect to that of the other zones so that at any point during the adsorption cycle, the number of zones in the adsorption step is greater than the number of zones not in the adsorption step.

Suitably, the pressure of the gas being fed to the adsorption step is substantially constant in a given adsorption cycle. The pressure of the feed gas suitably is not varied discretely during the adsorption step in a given adsorption cycle. The adsorption cycle preferably does not contain more than one adsorption step but if it does, then the pressure of the feed gas in each more than one step is desirably the same as in the other steps of that cycle.

Preferably, the pressure of the feed gas is not varied from one adsorption cycle to another, but, as desired, a feed gas of different pressure to that in a subsequent or prior adsorption cycle in the same or a different adsorption zone may be employed, The feed gas is suitably split upstream of the adsorption zones to produce multiple streams of feed gas for feeding to the at least two adsorption zones that are on-line at any given time.

In the regeneration step, a regeneration gas is suitably fed to the adsorption zone being regenerated so as to desorb the adsorbed component thereby regenerating the zone for a subsequent adsorption step in a new adsorption cycle.

Advantageously, a high process throughput may be secured as compared to prior art processes for a given scale of apparatus and avoids the disadvantage of higher cost, flow fluctuations and pressure drop associated with the use of larger scale equipment to achieve a comparable throughput.

The invention provides in a second aspect, thermal swing adsorption apparatus for conducting thermal swing adsorption of a component in a feed gas, the apparatus comprising at least three parallel thermal swing adsorption zones adapted to receive an adsorbent bed and means for controlling the flow of the feed gas through the at least three zones such that each bed undergoes repeated adsorption cycles which cycle comprises an adsorption step to remove or to reduce the level of the component from the feed gas and in which the feed gas is fed continuously to the adsorption zone during the adsorption step, depressurisation of the zone, a regeneration step to desorb the adsorbed component and repressurisation of the adsorption zone, and wherein the adsorption cycle of each zone is phased with respect to that of the other zones so that, in use, the number of zones in the adsorption step is greater than the number of zones not in the adsorption step.

The regeneration step suitably comprises feeding a regeneration gas to the adsorption zone undergoing regeneration. The apparatus according to the invention also suitably comprises means for controlling the flow of a regeneration gas such that the regeneration step may be successively performed for each of the adsorption zones and a heater for heating the regeneration gas.

The means for controlling the flow of feed gas may comprise conduits for gas flow in or connecting the zones and connecting each bed to a source of the feed gas and to an outlet from the apparatus for the gas treated by removal or reduction of the undesired component, valve means in the conduits operable to open and close respective ones of the conduits. It is especially preferred that the means for controlling the flow of gas comprises valve control means programmed to operate the valve means in sequence to produce the required adsorption cycles of operation.

The apparatus also suitably comprises means to control the flow of gas for regeneration, depressurisation and repressurisation.

In a preferred embodiment, the adsorption zone is defined by a conventional adsorption vessel. Preferably the apparatus comprises three adsorption vessels.

As a practical advantage, the use of three adsorption vessels each having half the capacity of each of two larger vessels requires about 25% less adsorbent than the two vessels of twice the capacity. In operating the two bed, large vessel system conventionally, one bed at a time would be on-line. However, in operating the three vessel system, two of the three vessels would be on-line at a given time providing a comparable throughput. Moreover, by virtue of splitting the feed gas into two streams to feed both vessels, the size of tubing and valves required in the plant will be smaller and provide significant cost benefits as compared to conventional apparatus because typically the cost of valves increases greatly with size.

Preferably, the process according to the invention is carried out in the apparatus according to the invention.

Suitably, at least two zones are in the adsorption step and at least one is in the regeneration step at any point during the adsorption cycle. Preferably, the number of zones in the adsorption step at any point during the adsorption cycle is constant so as to provide advantageously a relatively constant throughput of the feed gas and reducing fluctuations in flow volume in a downstream process. Optimally, the number of zones in the adsorption step at any point during the cycle is one fewer than the total number of adsorption zones so that, at any point only one zone is in the regeneration step so as to maximise throughput of the feed gas.

In a preferred embodiment the adsorption cycle of each zone commences at a different time to the commencement of the adsorption cycle of the other zones and for all the adsorption zones is substantially the same duration. More preferably, in addition, the adsorption step for each zone is substantially the same duration as that for the other zones. More preferably, the ratio of the duration of the adsorption step to the adsorption cycle is not less than the ratio of one less than the number of adsorption zones to the number of adsorption zones.

For reference, the adsorption cycle herein is considered to start with the adsorption step and then to be followed by depressurisation, the regeneration step and repressurisation.

The feed gas comprises a desired component and a component to be removed from the feed gas by adsorption. For example the feed gas may contain carbon dioxide and water. The feed gas may be natural gas or synthetic gas and in a preferred embodiment, the feed gas is air. After treatment, the gas is suitably subjected to a downstream process of cryogenic separation especially for the recovery of oxygen and/or nitrogen.

Where the feed gas contains carbon dioxide and water, it is suitably treated by contacting with a first adsorbent so as to remove the water prior to removal of carbon dioxide suitably on a second adsorbent. Suitable adsorbents include alumina, silica gel, activated alumina, impregnated alumina, and molecular sieves, for example zeolite of the X type, A type and LSX. Preferably the zeolite has a silicon to aluminium ratio of 1.0 to 1.25. The water adsorbent material is preferably silica gel, activated alumina or impregnated alumina and the carbon dioxide adsorbent material may be a molecular sieve for example, a zeolite. The zeolite may be bound or binderless. Preferably, the zeolite is sodium exchanged zeolite X, sodium exchanged zeolite Y or calcium exchanged zeolite X. More than one adsorbent may be employed in a single bed, for example as separate layers, as desired.

Preferably, the water adsorbent and carbon dioxide adsorbent are arranged in a composite bed with the carbon dioxide adsorbent downstream of the water adsorbent although separate beds may be employed if desired.

The TSA process according to the invention is preferably operated using at least three parallel flow paths and optimally the same number of flow paths as adsorption zones, so as to allow the process to be operated in a cyclical manner comprising adsorption and desorption with the separate flow paths being cycled out of phase to provide a pseudo-continuous flow of feed gas from the process through the at least three adsorption zones. This arrangement is also beneficial in reducing cost and complexity of the process design.

The feed gas is suitably fed to the adsorption step at a temperature of −50 to 80° C. and preferably 0 to 60° C., especially 5 to 50° C. Suitably the pressure of the feed gas is at least 100000 N/m$^2$, preferably 200000 to 4000000 more preferably 200000 to 3000000 and desirably 200000 to 2000000 N/m$^2$. The feed gas is fed in a continuous manner to the adsorption zone during the adsorption step.

In the process, the feed gas is introduced into an adsorption zone and contacted with the adsorbent, suitably in the form of a bed. As the mixture passes through the adsorbent, the component(s) to be adsorbed are adsorbed and the remaining gas then passes out of the adsorption zone. During the process a front of the gas to be adsorbed forms in the adsorbent and passes through it. As desired, the adsorption step is then terminated and the adsorption zone is then heated and optionally subjected to a reduced pressure and is purged of the adsorbed gas during regeneration by feeding a regeneration gas to the zone.

The adsorption step is suitably operated in a conventional manner known to those skilled in the art.

Preferably, the regeneration gas comprises a gas recycled from a downstream process, for example a nitrogen-rich waste gas stream from an air separation plant which is dry and free of carbon dioxide. Preferred regeneration gases include oxygen, nitrogen, methane, hydrogen and argon and mixtures thereof.

The regeneration of the adsorbent is suitably carried out using a regeneration gas at a temperature above the bed adsorption temperature, suitably at a temperature of 0 to 400° C., preferably from 40 to 200° C.

Suitably, the regeneration pressure is 10000 to 2000000 N/m$^2$ and preferably 20000 to 1500000 N/m$^2$. It is especially desirable that the regeneration pressure does not exceed 50 percent of the pressure of the feed gas.

Repressurisation may be effected by passing upstream, feed gas or downstream, treated gas through the bed to be regenerated. The repressurisation gas is at a higher pressure than the adsorption zone.

Preferably, the process is operated with a molar flow of regeneration gas to the feed gas of 0.05 to 0.8 more preferably 0.1 to 0.5.

Suitably, in a TSA process and a TPSA process, the feed gas is fed to the adsorption zone for a period of 6 to 1000 minutes and preferably 70 to 300 minutes. In a TEPSA process the feed gas is suitably fed to adsorption unit zone for a period of 10 to 150 minutes and preferably 20 to 80 minutes.

Advantageously, in use, where the adsorbent is free standing in a horizontal or vertical vessel, the fluid flow is suitably not more than 90% and desirably not more than 70% of the flow at which fluidisation of the bed occurs.

The present invention also allows independent feed gases which have a different characteristic to the other gases. Each feed gas may be of different composition or have different properties, for example flow, pressure, temperature and rate, on being fed to the adsorption cycle. In these circumstances, each adsorption zone is designed to take account of the most extreme conditions of the different feed stocks thereby enabling the different feeds to be cycled between each bed with regeneration in between. Whilst the feed gas composition or properties may be different from one adsorption cycle to another, within a given adsorption cycle, the feed gas composition and properties are not altered and the gas is fed to the adsorption zone continuously.

The invention also provides in a preferred embodiment a thermal swing adsorption apparatus comprising at least three adsorption vessels, a feed gas inlet assembly in fluid communication with each vessel, an outlet assembly in fluid communication with the at least three vessels being arranged in parallel paths, flow control means to permit the feed gas to pass through each vessel and to the outlet assembly, a regeneration assembly comprising a conduit in fluid communication with the outlet assembly whereby a regeneration gas is able to be passed into each vessel and a heater to heat the regeneration gas, the flow control means and the regeneration assembly being arranged so that each vessel, in use, repeatedly undergoes an adsorption cycle comprising an adsorption step, depressurisation, a regeneration step and repressurisation and the adsorption cycle for each vessel is out of phase with the cycle for all the other vessels provided that, in use, at least two vessels are in the adsorption step at any time and the flow control means feeds the feed gas continuously to the adsorption zone during the adsorption step.

The present invention may be employed in combination with otherwise conventional air separation plant and other apparatus for gas separation. The invention also has applicability in other fields including remote applications, for example shipboard applications, where oxygen storage may be subject to safety scrutiny. The invention provides advantage in applications where continuous supply of a gas to a downstream process is important for economic, safety or other masons. For example the need for reliability of supply of oxygen for a downstream Fisher Tropsch or methanol production process is important and the present invention provides a safety benefit by being operable in a conventional mode, that is using a pair of beds in the event that the third vessel is inoperative for example in an emergency or due to scheduled process down-time.

BRIEF DESCRIPTION OF SEVERAL VIEWS OF THE DRAWINGS

In FIGS. 1 and 3, "D" denotes depressurisation, "R" denotes repressurisation and "REGEN" denotes regeneration. In FIG. 1, a conventional TSA process cycle is shown in which the adsorbent in a first bed is on-line, receiving a feed gas and adsorbing at least one undesired component of the gas and the treated feed is then passed downstream, optionally for further processing. While the first bed is on line, the second bed is sequentially depressurised, regenerated by passing a regeneration gas through the bed counter-current to that of the feed gas when on-line and then repressurised. The regeneration gas is heated for at least the initial period of regeneration to provide a heat pulse which passes through the second bed and desorbs the adsorbed, undesirable component. Repressurisation of the second bed is then carried out. After repressurisation, the second bed is then switched to on-line operation and the first bed is taken off-line and subjected to the depressurisation, regeneration and repressurisation process.

DETAILED DESCRIPTION OF THE INVENTION

A conventional TSA process typically has a cycle time of some hours whereas a conventional PSA process has a cycle time of the order of tens of minutes. Accordingly, use of downstream, treated gas to repressurise the bed undergoing regeneration does not adversely affect the continuity of the downstream flow to the same extent as in a PSA process.

Figure 2:
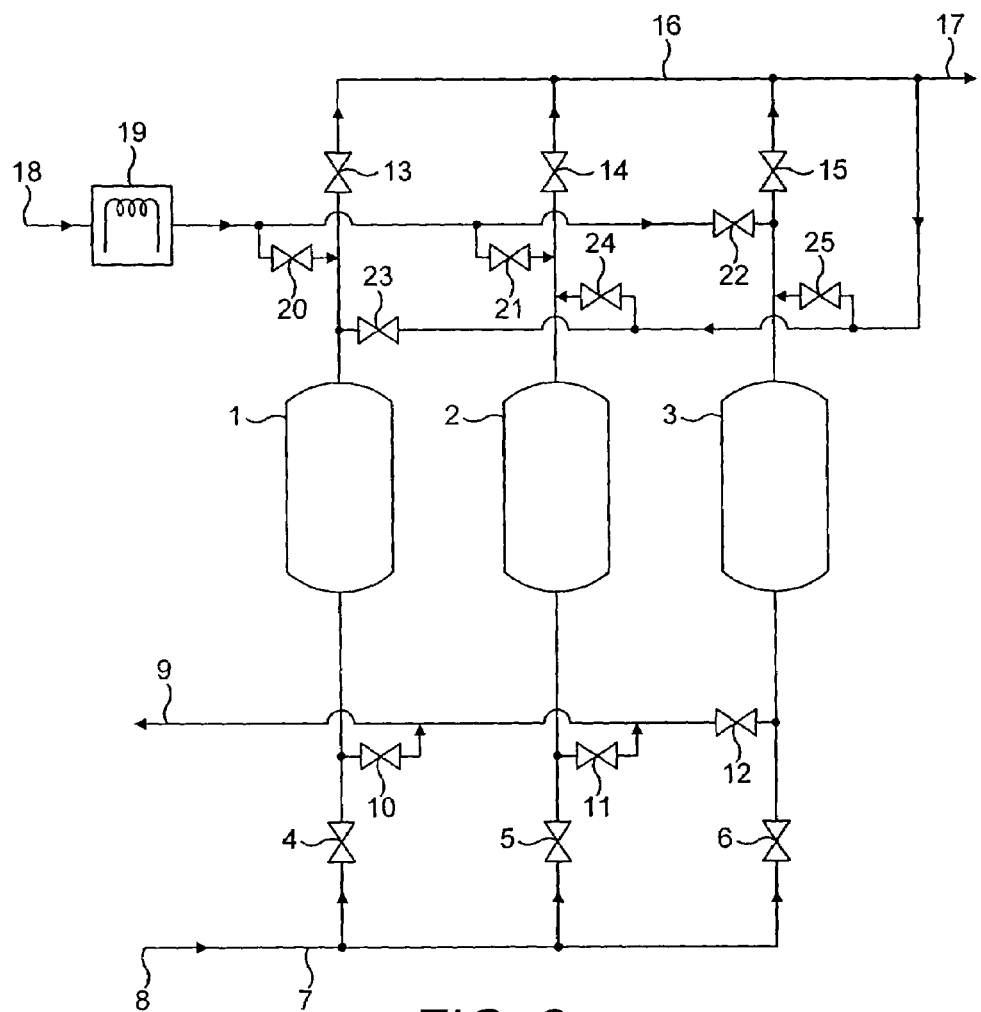
FIG. 2 is a schematic illustration of apparatus according to the invention.

Apparatus for use in accordance with the present invention shown in FIG. 2 comprises three beds of adsorbent 1, 2 and 3 arranged in parallel. Each is connected via a respective inlet valve 4, 5 and 6 to an inlet manifold 7 connected to a source 8 of feed gas. The inlet end of each of the beds 1, 2 and 3 is also connected to a first venting manifold 9 via respective venting valves 10, 11 and 12. The outlet from each of the beds 1, 2 and 3 is connected via a respective outlet valve 13, 14 and 15 to an outlet manifold 16 which is connected to a downstream processing apparatus such as the cold box of an air separation unit 17. Regeneration gas for example from an air separation unit is supplied to the apparatus of FIG. 2 at an input 18 via a heater 19 which is periodically switched on to provide a heated pulse of regeneration gas and is connected to the outlet end of each bed 1, 2 and 3 for counter-current purging flow via a respective inlet valve 20, 21 and 22. The outlets of the beds 1, 2 and 3 are interconnected amongst themselves via valves 23, 24 and 25 to allow flow of repressurisation gas from outlet manifold 16. The operation of the control valves is controlled in a known manner by appropriate control means, not illustrated, but in a novel sequence to provide the phased adsorption cycles for the beds 1, 2 and 3.

Figure 3:
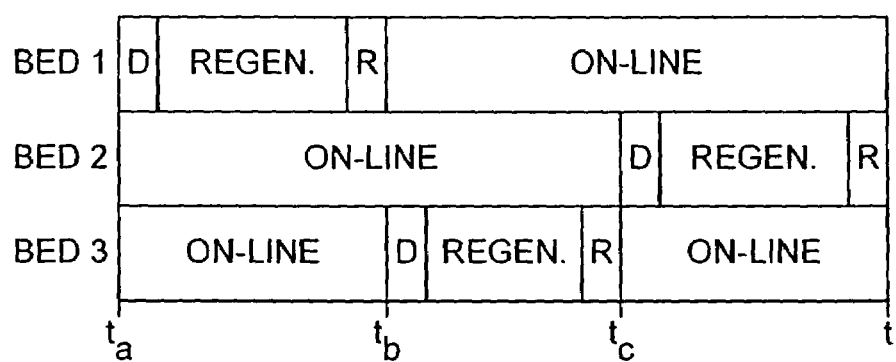
FIG. 3 shows the cycle of operation of a process according to the invention and the apparatus of FIG. 2.

The phasing of the operations of the beds 1, 2 and 3 is illustrated in FIG. 3 which shows one adsorption cycle. It is this cycle which is repeated. In FIG. 3 it can be seen that during the on-line or feed period of each bed, at least one of the other beds and is also on-line. Each bed is sequentially operated on-line, depressurised (D), regenerated and then repressurised (R). As the first bed 1 is taken off-line at $t_a$, the regenerated bed 2 is brought on-line, having been depressurised at $t_c$, regenerated and repressurised. During this time, the third bed 3 is on-line having been brought on-line at $t_c$ during the adsorption step of the first bed 1 and is then taken off-line during the adsorption step of the second bed 2 at $t_b$ after the first bed 1 is brought on-line. On being taken off-line, the first bed is then depressurised, regenerated and then repressurised and brought on-line at $t_b$ at which time, the third bed is taken off-line and subjected to depressurisation, regeneration and repressurisation.

As one bed is taken off-line and another is brought on-line, a short period of overlap during which the two beds are both on-line is provided to allow for the mechanical opening and closing of valves.

The cycles of the beds suitably are phased so that there are overlaps for example of 10 to 20 seconds between the on-line periods of the beds. During such overlap periods, venting may be carried out to maintain a constant output of treated gas.

It will readily be appreciated that further beds may be included in parallel in a modified version of the apparatus shown in FIG. 2.

The invention is illustrated by reference to the following non-.limiting examples and the accompanying drawings.

EXAMPLES 1 TO 6 AND COMPARATIVE EXAMPLES A1 TO A12

The effectiveness of a TSA system according to the invention as shown in FIG. 2 with adsorption cycles phased as shown in FIG. 3 and employing vertical beds was assessed by simulation.

Figure 1:
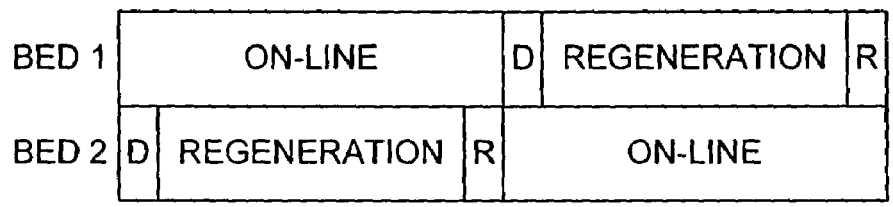
FIG. 1 shows a conventional cycle for the operation of a prior art two bed TSA process.

Conventional processes were simulated according to the conventional TSA cycle shown in FIG. 1 for operation with two beds and two pairs of beds where the beds are alternately on-line and off-line for comparative purposes.

Three sets of runs were simulated, at 1000000 Nm$^{-2}$, 600000 Nm$^{-2}$ and 300000 Nm$^{-2}$.

Zeolite 13X of density 640 kg/m$^3$, was used as the adsorbent. Runs were simulated using small adsorbent beads and large adsorbent beads, altered, small beads being 1.0 to 2.4 mm in diameter and large beads being 2.4 to 5 mm.

The molar purge to air ratio (P/A) was 0.15, contact time was set at 7 seconds and the temperature of the feed gas at 15° C. The beds were taken to be 5 m diameter. The approach to fluidisation of the bed was constant for runs at a given pressure and was less than 70%. A maximum regeneration temperature of 140° C. was used.

The results are shown below in Tables 1 to 3.

TABLE 1

Vertical bed at 1000000 Nm$^{-2}$

| Eg | Bead Size | No of Beds | Bed Height (m) | Air Flow (Nm3/h) | DP, Pa/m (air) | DP, Pa/m (hot purge) |
|---|---|---|---|---|---|---|
| A1 | SMALL | 2 | 1.06 | 100,000 | 3533 | 2755 |
| 1 | SMALL | 3 | 1.06 | 200,000 | 3533 | 7073 |
| A2 | SMALL | 4 | 1.06 | 200,000 | 3533 | 2755 |
| A3 | LARGE | 2 | 1.06 | 150,0000 | 3509 | 1687 |
| 2 | LARGE | 3 | 1.06 | 300,000 | 3509 | 5143 |
| A4 | LARGE | 4 | 1.06 | 300,000 | 3509 | 1687 |

DP (air) refers to the pressure drop when operated on line and DP (hot purge) to the pressure drop during the regeneration step.

TABLE 2

Vertical bed at 600000 Nm$^{-2}$

| Eg | Bead Size | No of Beds | Bed Height (m) | Air Flow (Nm3/h) | DP, Pa/m (air) | DP, Pa/m (hot purge) |
|---|---|---|---|---|---|---|
| A5 | SMALL | 2 | 1.4 | 80000 | 4000 | 2100 |
| 3 | SMALL | 3 | 1.4 | 160000 | 4000 | 5158 |
| A6 | SMALL | 4 | 1.4 | 160000 | 4000 | 2100 |
| A7 | LARGE | 2 | 1.4 | 120000 | 3830 | 1200 |
| 4 | LARGE | 3 | 1.4 | 240000 | 3830 | 3568 |
| A8 | LARGE | 4 | 1.4 | 240000 | 3830 | 1200 |

TABLE 3

Vertical bed at 300000 Nm$^{-2}$

| Eg | Bead Size | No of Beds | Bed Height (m) | Air Flow (Nm3/h) | DP, Pa/m (air) | DP, Pa/m (hot purge) |
|---|---|---|---|---|---|---|
| A9 | SMALL | 2 | 2.47 | 50000 | 3619 | 1183 |
| 5 | SMALL | 3 | 2.47 | 100,000 | 3619 | 2755 |
| A10 | SMALL | 4 | 2.47 | 100,00 | 3619 | 1183 |
| A11 | LARGE | 2 | 2.47 | 70,0000 | 2808 | 562 |
| 6 | LARGE | 3 | 2.47 | 140,000 | 2808 | 1518 |
| A12 | LARGE | 4 | 2.47 | 140,000 | 2808 | 562 |

From the above results It can be seen that in Examples 1 to 6, by adding a third bed and operating the adsorption cycles out of phase a much higher air flow than a conventional two bed system and a comparable air flow as a conventional four bed system may be achieved. With three beds rather than four, major savings in capital and variable cost may be achieved.

EXAMPLES 7 AND 8 AND COMPARATIVE EXAMPLES B1 AND B2

A series of simulations were carried out under the same conditions as set out under Examples 1 to 6 and A1 to A12 for a horizontal bed of 5 m diameter and 2 m depth. The pressure is 600000 Nm$^{-2}$.

The results are shown in Table 4.

TABLE 4

| Eg | Bead Size | No Beds | Air Flow (Nm3/h) | Bed Length (m) | DP, Pa/m (air) | DP, Pa/m (hot purge) |
|---|---|---|---|---|---|---|
| B1 | SMALL | 2 | 1000,000 | 34 | 3711 | 1515 |
| 7 | SMALL | 3 | 1000,000 | 16 | 3711 | 4379 |
| B2 | LARGE | 2 | 1000,000 | 34 | 1711 | 571 |
| 8 | LARGE | 3 | 1000,000 | 17 | 1700 | 5391 |

Operating according to the present invention for a given air flow enables a horizontal bed of much shorter length to be employed than would be usable in a conventional process. Alternatively, for a given bed length, the present invention allows a significantly higher throughput to be achieved than a conventional process.

EXAMPLE 9 AND COMPARATIVE EXAMPLE C1

A series of simulations were carried out under the same conditions as set out under Examples 1 to 6 and A1 to A12 for a radial bed of 5 m diameter and 1.2 m depth with a small bead size adsorbent. The pressure is 600000 Nm$^{-2}$.

The results are shown in Table 5.

TABLE 5

| Eg | Air Flow (NM3/h) | Bed Length (m) | No Beds | DP, Pa/m (air) | DP, Pa/m (hot purge) |
|---|---|---|---|---|---|
| C1 | 1000,000 | 30 | 2 | 4180 | 2618 |
| 9 | 1000,000 | 15 | 3 | 4180 | 6828 |

Operating according to the present invention for a given air flow enables a radial bed of much shorter length to be employed than would be usable in a conventional process. Alternatively, for a given bed length, the present invention allows a significantly higher throughput to be achieved than a conventional process.

The invention claimed is:

1. A process for the reduction of the level of at least one undesired component in a feed gas comprising passing the feed gas to at least three parallel thermal swing adsorption zones, each zone containing an adsorbent and being operated in an adsorption cycle which comprises an adsorption step to remove or to reduce the level of the component from the feed gas and in which the feed gas is fed continuously to the adsorption zone during the adsorption step, depressurisation of the adsorption zone, a regeneration step to desorb the adsorbed component and repressurisation of the adsorption zone, wherein the adsorption cycle of each zone is phased with respect to that of the other zones so that at any point during the adsorption cycle, the number of zones in the adsorption step is greater than the number of zones not in the adsorption step.

2. A process as claimed in claim 1 in which the feed gas from which the undesired component has been removed is fed to a downstream cryogenic separation process.

3. A process as claimed in claim 1 or claim 2 in which the feed gas is selected from synthetic gas, natural gas and air.

4. A process as claimed in claim 1 in which the adsorbent is selected from alumina, silica gel, activated alumina, impregnated alumina, and a molecular sieve.

5. A process as claimed in claim 1 in which said at least one undesired component is at least two undesired components that are removed from the feed gas and in which the at least two undesired components comprise carbon dioxide and water and the adsorbent comprises a first adsorbent selected from silica gel, activated alumina, impregnated alumina and alumina and a second, downstream adsorbent comprising a zeolite.

6. A process as claimed in claim 5 in which the zeolite is selected from a zeolite of the X type, A type, LSX type having a silicon to aluminium ratio of 1.0 to 1.25.

7. A process as claimed in claim 1 in which the feed gas is at a temperature of −50 to 80° C.

8. A process as claimed in claim 7 in which the feed gas is at a temperature of 5 to 50° C.

9. A process as claimed in claim 1 in which the regeneration of the adsorbent is carried out at a temperature of 0 to 400° C.

10. A process as claimed in claim 1 in which the adsorbent is regenerated by means of a regeneration gas and the molar ratio of regeneration gas to feed gas is 0.05 to 0.8.

11. A process as claimed in claim 10 in which the regeneration gas is at a pressure of 10000 to 2000000 $N/m^2$.

12. A process as claimed in claim 1 in which the feed gas is at a pressure of at least 100000 $N/m^2$.

13. A process as claimed in claim 12 in which the feed gas is at a pressure of 200000 to 4000000 $N/m^2$.

14. A process as claimed in claim 1 in which the feed gas is at a temperature of 5 to 50 degree C. and a pressure of 200000 to 4000000 $N/m^2$.

15. A process as claimed in claim 1 in which the pressure of the gas being fed to the adsorption step is substantially constant.

16. A process as claimed in claim 1 in which repressurization of the adsorption zone is effected by feeding to the zone a gas at higher pressure from upstream of the adsorption zone.

17. A process as claimed in claim 1 in which the adsorption cycle for all the adsorption zones is substantially the same duration.

18. A process as claimed in claim 1 in which the ratio of the duration of the adsorption step to the adsorption cycle is not less than the ratio of one less than the number of adsorption zones to the number of adsorption zones.

19. A process as claimed in claim 1 having three of said parallel thermal swing adsorption zones.

20. A process as claimed in claim 1 in which the number of zones in the adsorption step at any point during the cycle is one fewer than the total number of adsorption zones.

21. A thermal swing adsorption apparatus for conducting thermal swing adsorption of at least one undesired component in a feed gas, the apparatus comprising at least three parallel thermal swing adsorption zones adapted to receive an adsorbent bed and means for controlling the flow of the teed gas through the at least three zones such that each bed undergoes repeated adsorption cycles which cycle comprises an adsorption step to remove or to reduce the level of the component from the feed gas and in which the feed gas is fed continuously to the adsorption zone during the adsorption step, depressurization of the zone, a regeneration step to desorb the adsorbed component and repressurization of the adsorption zone, and wherein the adsorption cycle of each zone is phased with respect to that of the other zones so that in use, the number of zones in the adsorption step is greater than the number of zones not in the adsorption step.

22. Apparatus as claimed in claim 21 in which the means for controlling the flow of feed gas comprises conduits for gas flow in or connecting the zones and connecting each bed to a source of the feed gas and to an outlet from the apparatus for the gas treated by removal or reduction of the at least one undesired component, valve means in the conduits operable to open and close respective ones of the conduits.

23. A thermal swing adsorption apparatus comprising at least three adsorption vessels, a feed gas inlet assembly in fluid communication with each vessel, an outlet assembly in fluid communication with the at least three vessels being arranged in parallel paths, flow control means to permit the feed gas to pass through each vessel and to the outlet assembly, a regeneration assembly comprising a conduit in fluid communication with the outlet assembly whereby a regeneration gas is able to be passed into each vessel and a heater to heat the regeneration gas, the flow control means and the regeneration assembly being arranged so that each vessel, in use, repeatedly undergoes an adsorption cycle comprising an adsorption step, depressurization, a regeneration step and repressurization and the adsorption cycle for each vessel is out of phase with the cycle for all the other vessels provided that, in use, at least two vessels are in the adsorption step at any time and the flow control means feeds the feed gas continuously to the adsorption zone during the adsorption step.

24. Apparatus as claimed in claim 23 in which the means for controlling the flow of feed gas comprises conduits for gas flow in or connecting the zones and connecting each bed to a source of the feed gas and to an outlet from the apparatus for the gas treated by removal or reduction of at least one undesired component, valve means in the conduits operable to open and close respective ones of the conduits.

25. Apparatus as claimed in claim 21 or claim 23 in which the adsorption zone is defined by a vessel selected from a horizontal, vertical and radial bed vessel.

26. Apparatus as claimed in claim 21 or claim 23 in which the means for controlling the flow of gas comprises valve control means programmed to operate valve means in sequence to produce the required adsorption cycles of operation.

27. A process as claimed in claim 1, conducted using the apparatus as claimed in claim 21 or claim 23.

* * * * *